Sept. 5, 1944.   W. DE FRIES   2,357,729
BERTH ASSEMBLY FOR VEHICLES
Filed March 29, 1941   3 Sheets-Sheet 1
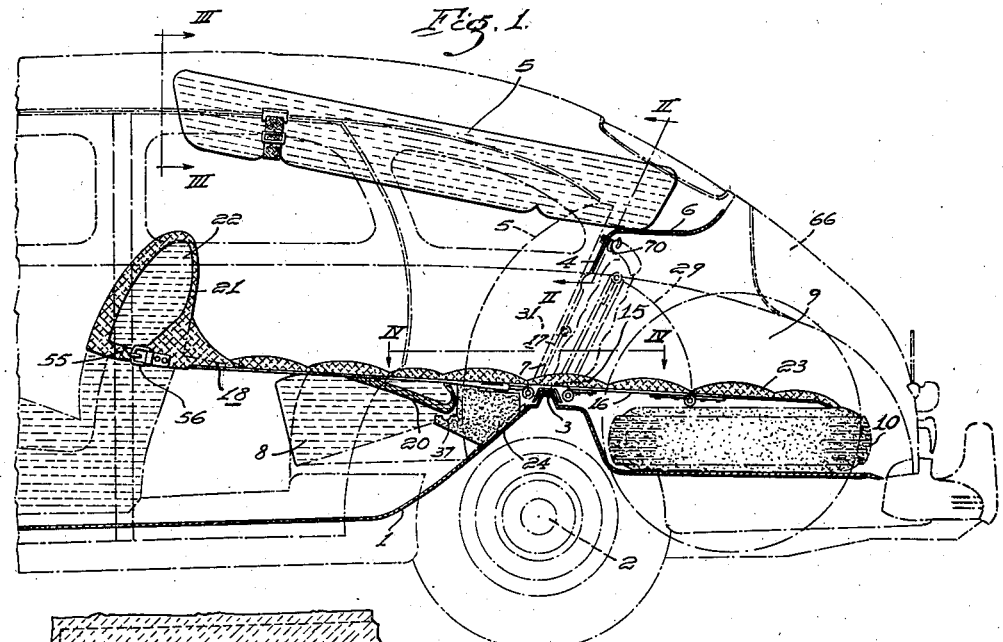
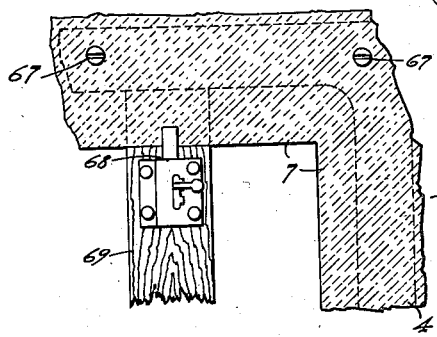
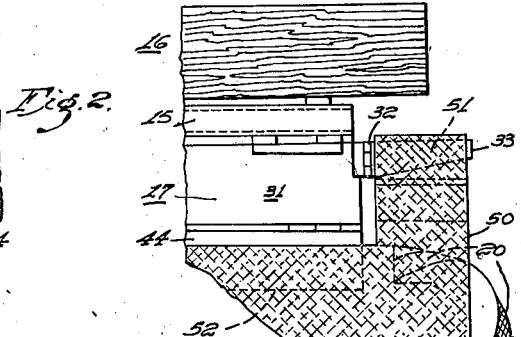
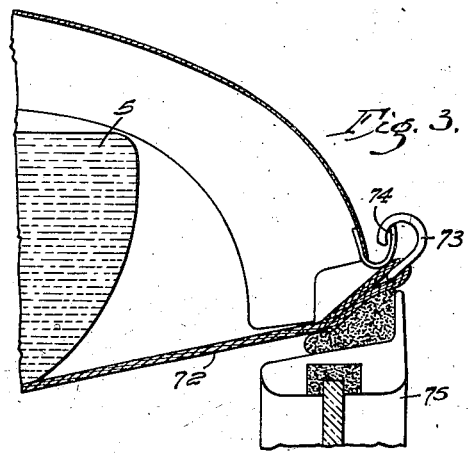
INVENTOR
*Walter de Fries.*
BY
*William R. Coley*
ATTORNEY

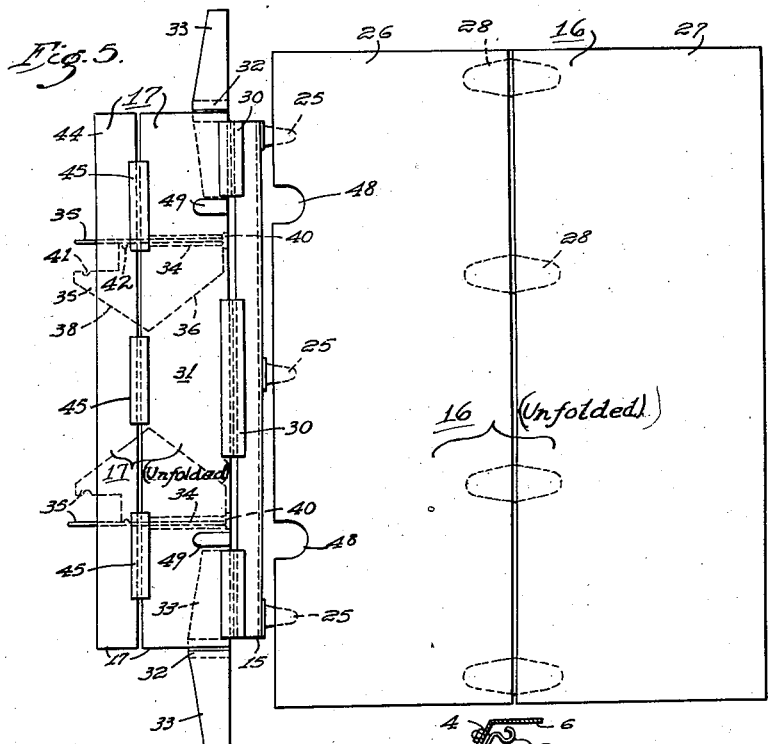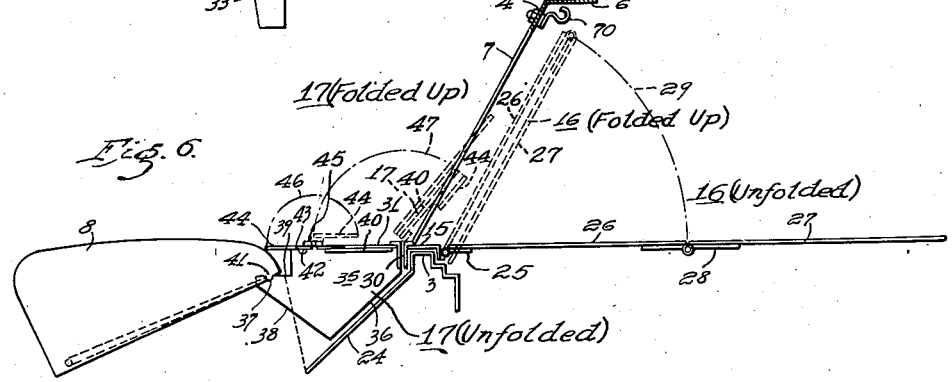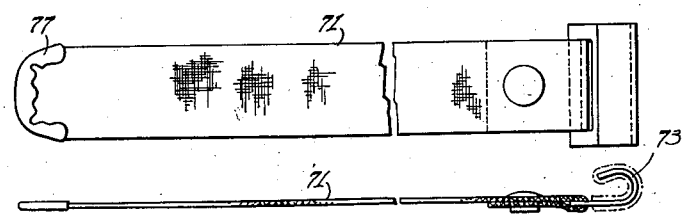

Sept. 5, 1944.  W. DE FRIES  2,357,729
BERTH ASSEMBLY FOR VEHICLES
Filed March 29, 1941  3 Sheets-Sheet 3
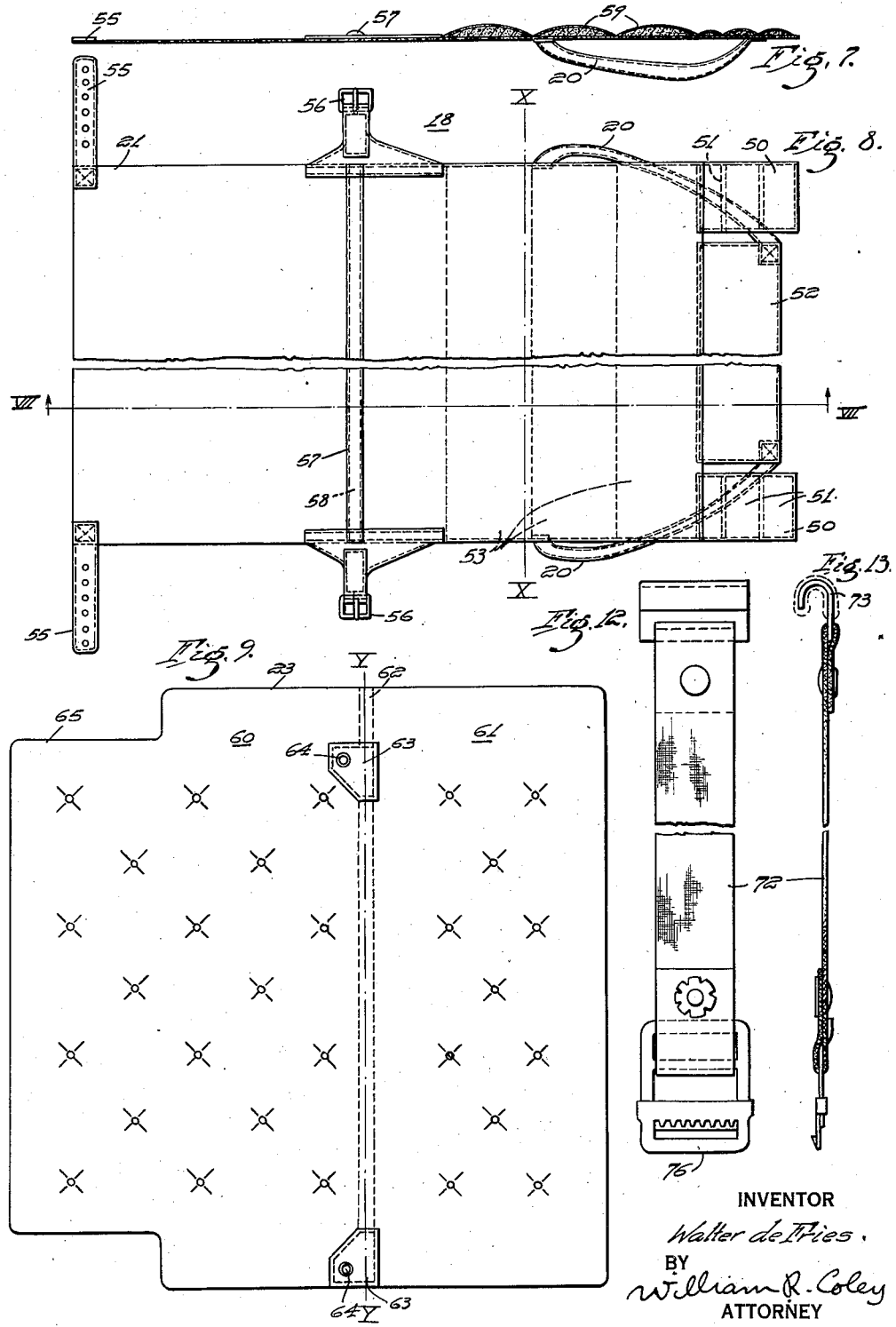
INVENTOR
*Walter de Fries.*
BY
*William R. Coley*
ATTORNEY Patented Sept. 5, 1944

2,357,729

UNITED STATES PATENT OFFICE 2,357,729

BERTH ASSEMBLY FOR VEHICLES

Walter de Fries, Pittsburgh, Pa., assignor to Fort Pitt Bedding Company, a corporation of Pennsylvania Application March 29, 1941, Serial No. 385,785

10 Claims. (Cl. 5—118)

My invention relates to berth assemblies for vehicles and more particularly to the conversion of passenger automobiles in part to a sleeping compartment.

This invention is directed to equipment designed to permit the conversion of the rear end of any standard five-passenger automobile into a sleeping compartment and is especially adapted for use with cars of the "sedan" type, having built-in rear trunk compartments, as currently featured as part of the "streamline" design of these vehicles.

Its general purpose is to provide facilities for rest to hunters, sportsmen, prospectors, tourists, service men of public utilities, etc., who travel to out of the way places, or to serve in emergency cases to physicians, highway patrol officers, etc., as means for carrying injured or distressed persons to hospitals or relief stations.

While various ideas for providing conversion equipment of this general character for limited use in passenger automobiles have been disclosed heretofore, all such ideas of which I am aware had one undesirable feature in common, in that they required special provision for the installation of such equipment at the time of the building of the car body, in which they were to be used, to insure proper function of their mechanism.

The arrangement hereinafter disclosed, however, is intended to be supplied as an accessory to any standard car model of the type above referred to, to be installed as a more or less permanent fixture in much the same manner as car heaters or radios are added to stock automobiles at the purchaser's option. It is intended to be supplied to the trade preassembled and packed ready for installation and in sizes suitable for certain designated makes of cars.

One object of my invention is to provide an assembly of the character set forth, comprising as small a number as possible of prefabricated parts in order to make the apparatus substantially foolproof, by reason of the fact that the various parts of the apparatus are very readily placed in their final operating positions without requiring any particular amount of thought on the part of the operator.

Another object of my invention is to provide a berth assembly for vehicles having one part supported by a portion of a seat, preferably the rear seat, disposed in an out-of-normal position and another part supported by a portion of preferably the front seat disposed in a normal position.

A further object of my invention is to provide a berth assembly having one part supported on the underframe construction of the vehicle and having other parts supported on preferably the seating portion of the rear seat disposed in an out-of-normal position and on the back of the front seat in a normal position.

A further object of my invention is to provide a device of the character set forth in which the berth assembly extends through an apertured retaining structure for the back of the rear seat into the trunk compartment.

Another object of my invention is to provide a berth assembly having an anchor part supported or mounted on a portion of the underframe construction of the vehicle with one or more other parts pivotally mounted on the anchor part to extend substantially horizontally or to swing into position substantially parallel to the normal position of the back of the rear seat.

A further object of my invention is to provide a prefabricated foldable assembly capable of occupying two different positions in a car: being laid out flat for sleeping purposes and being readily foldable out of the way when the car is being used for seating purposes only.

Still another object of my invention is to provide a berth assembly having one part supported on the underframe construction preferably near the rear seat of the vehicle and a hammock part extending between the first part and preferably the back of the front seat.

My invention comprises, in general, (1) A berth assembly featuring hinged parts or sections, preferably formed or stamped from metal (such as sheet steel, etc.) and extending in one direction, so that they may be folded up into a flat pack for out-of-the-way storage when not in use. Also hingedly related to these parts and extending in the opposite direction are sections of plywood or composition board likewise joined to each other with hinges, so that they too may be folded together for the purpose stated, the entire set of hinged parts thus forming a prefabricated platform assembly;

(2) A hammock shaped at one end for draping over the back of the front or driver's seat of the car and tailored with connections to the assembly above mentioned and being further provided with an extension in the form of (3) A cotton pad or mattress, cut to follow the general outline of the flat surface of the assembly and its component parts in their unfolded arrangement.

Figure 1 is a longitudinal cross section through the body of a standard five-passenger "sedan" type of car, showing in solid lines my arrangement of facilities for conversion of its rear portion into a sleeping compartment, unfolded for use as such, and showing in dotted lines certain of the parts folded up for storage with the rear seating portion and back cushion in their normal positions.

Figs. 2 and 3 are fragmentary sections taken on lines II—II and III—III of Fig. 1, respectively, at right angles to certain parts of the structure shown in Fig. 1;

Fig. 4 is a plan view of a part of the unfolded berth assembly with the rear back cushion out of the way and illustrating the connection of the rear end of the hammock to the platform assembly and the seating portion of the rear seat, taken along the line IV—IV of Fig. 1;

Fig. 5 is a top plan view of a bracket or platform assembly forming part of my berth assembly;

Fig. 6 is a side view of the assembly shown in Fig. 5, partly in section, together with certain associated parts of the vehicle;

Figs. 7 and 8 are, respectively side and top plan views of the hammock in its flat tailored arrangement;

Fig. 9 is a top plan view of the cotton pad or mattress which covers one part of the berth assembly; and Figs. 10 to 13, inclusive, are views of certain details of the structure shown in Fig. 1.

Referring now to the drawings, there is shown in Fig. 1 an outline of the underframe 1 of the car body sketched in dotted lines with its upward sweep above the rear axle 2 to provide clearance for the differential drive and the mounting of the spring support over the axle, as is customary. For further stiffening of this portion of the bottom, it is usually provided with a pressed-in channel section 3 (generally located at the high point of the underframe construction) above the rear axle, and a retaining structure or diaphragm plate 4 having its lower part disposed behind the back cushion 5 of the rear seat and bent in angle shape with the upper leg forming a horizontal shelf 6—under the roof of the car body and behind the upper end of the back cushion—which in turn connects with an upward sweep to the car roof for support of the latter, in a well-known way.

This diaphragm plate 4 has an aperture or opening 7 (Fig. 2) of a familiar type, extending through most of its center portion from the top of the channel 3 to a point slightly below the heel of its shelf 6, and extending crosswise of the car. The purpose of this aperture is to prevent the action of the diaphragm 4 as a sounding board, which in its solid condition would transmit and amplify vibrations originating from the rear axle drive and road contacts. For this reason, the remaining parts of this diaphragm, forming a frame around the opening, are usually covered with sound deadening compounds.

In standard car bodies, such as that shown, there is placed directly in front of this diaphragm plate 4 the back cushion 5 of the rear seat, with its lower edge wedged behind the rear seating cushion 8. Directly in back of the diaphragm plate 4 and facing the interior of the rear trunk compartment 9 is usually placed a fiber board covered with the same lining as the trunk compartment and supported on the diaphragm frame, which must be removed in cars intended to be equipped with my sleeping facilities and which for that reason is not shown in the drawings.

Inside the rear compartment 9, the usual spare tire 10 is either mounted in a well adjacent to one side of the interior in an upright position (as indicated in dotted lines) or lies flat on the floor of the rear compartment (as shown in solid lines) in which case it may be covered with a false bottom of plywood or fiber board, if desired.

My berth assembly comprises, in general, a platform assembly including an anchor part 15, preferably of channel shape, fitting over the inverted channel 3 of the underframe construction of the vehicle, there being pivoted to opposite sides of the anchor part 15, and extending longitudinally and transversely of the vehicle, foldable portions or sub-assemblies 16 and 17 which are capable of being extended in opposite directions in a substantially horizontal plane, as indicated in solid lines in Fig. 1, or of being folded into an out-of-the-way position to the rear of the back of the rear seat 5, the planes of such folded parts when occupying this out-of-the-way position being substantially parallel to the plane of the back of the rear seat. (See corresponding dotted lines in Figs. 1 and 6.) In addition, my berth assembly includes a hammock part 18 which has strap portions 20 secured to the seating portion 8 of the rear seat when disposed in a forwardly tilted out-of-normal position, said hammock having besides rear end loops 50 for attachment to the foldable portion 17 and also having attaching end portions 21 whereby it may be securely draped over and fastened to the back 22 of the front seat, and further includes an extension-pad or mattress 23.

Fig. 5 shows the arrangement of the bracket or platform assembly 15, 16, 17 as one of the three principal items constituting my conversion equipment or berth assembly. Its nucleus is the channel section 15 whose inside shape and dimensions conform to the outside of the channel section 3 forming part of the car bottom, so that it can be fitted neatly over it. Its width is approximately equal to the distance between the upright edges of the diaphragm aperture 7 between which it will be placed. Attached to this channel 15, preferably formed from sheet metal, and most conveniently to its flange facing the rear compartment 9 are hinges 25, which in turn connect with a fiber board 26 to which another fiber board 27 is fastened again by means of hinges 28 so arranged that these two boards may either form a continuous surface or be folded with their undersides facing each other when pushed up along the arc 29 (Figs. 1 and 6).

The other side of channel 15, that is, the side facing the rear interior of the car body, is equipped with hinges 30 to which is fastened a bracket plate 31 usually cut from a piece of sheet metal of suitable width and not longer than the distance between the upright edges of the diaphragm aperture 7. This bracket plate 31 carries on its narrow ends hinges 32 connecting to wing plates 33 in such a way that these latter may be folded under the bracket plate 31.

Attached to the under side of this bracket plate 31 with hinges 34 are two brackets 35, disposed in such a way that they may extend perpendicularly below or be folded flat against the under side of the bracket plate 31. It is their purpose to keep the bracket plate substantially on a level with the top of the channel 15 by supporting it on lower parts of the car bottom or underframe construction, for which reason their edges 36 are cut to fit the incline of the body bottom-pan 24 or other under-frame construction.

Another of their functions is to engage the rear edge 37 of the rear seat cushions 8, underframe or base, after the latter has been tipped upwardly from its normal position sufficiently to bring its top likewise in line with the elevations of channel 15 and bracket plate 31, as clearly shown in Figs. 1 and 6. For that purpose their other edge 38 extends to a point slightly forward of the rear edge of the rear seat underframe, where at the desired elevation it forms a shelf 39 on which the seat base 37 is supported. These brackets are conveniently stamped from sheet metal and in their forming an extension 40 at right angles to a perpendicular face of each bracket is provided, the top edge of each of which contacts the underside of the bracket plate 31 and thus provides a stop in their unfolding movement whenever they have reached a position at substantially right angles to the bracket plate 31. Also provided are recesses 41 and 42 on the shelf 39 and the shelf 43 above it (both recesses in edges of brackets 35), either of which may engage the rear underframe 37 of the seat cushion, so as to prevent its accidental slipping off under load, the upper or lower shelf being used depending on the depth of the cushion at its rear-end.

To bridge the gap between the edge of the bracket plate 31 and the upper edge of the rear end of the tilted seat, a filler plate 44 is provided, being attached to the bracket plate 31 by means of hinges 45. This filler plate may be folded back along the line of arc 46 (Fig. 6) whenever the rear seat cushion 8 is to be engaged by the upper shelf 43 of the bracket 35. In other words, this filler plate 44 is the means of adjustment required for fitting the bracket assembly 15, 16, 17 to the appointments of certain car interiors in "standard" or "de luxe models, which latter usually feature wider seats and deeper upholstery.

For normal use of the car (with passengers to be seated in the rear) bracket plate 31 is swung upward along the line of arc 47 (see Fig. 6) and wing plates 33 as well as brackets 35 folded flat against its underside (see corresponding dotted lines in Figs. 5 and 6) permitting the back cushion 5 of the rear seat to be placed in front thereof in its normal position, thus concealing the assembly entirely from the view of persons in the car's interior, as clearly shown in Fig. 1. If desired, to prevent rattle, channel 15 of the bracket assembly may be permanently fastened to the channel 3 of the car body with suitable screws, or the like, through its flanges for which purpose cutouts 48 and 49 are provided in the parts 26 and 31 to permit easy access for a screwdriver to the screw head.

Figs. 7 and 8 illustrate the hammock 18 in its flat condition as tailored, made from cotton duck or similar material. It features at its one end two extensions 50 with pockets 51 intended to be slipped over the wing plates 33 on the bracket assembly 17 as a means for fastening it at that end. End flap 52 located between these extensions is intended to be draped over the rear edge of the rear-seat cushion 8 and its two looped straps 20 are secured at one end to the sides of the hammock and at the other end to the respective outer corners of flap 52 for respectively engaging the rear corners of this cushion to prevent slip-off of the hammock from its intended position. See Figs. 1 and 4.

That portion of the hammock overlying the rear seat cushion 8 is provided with pockets 53 to 75 be stuffed with felt padding 59 where necessary to insure proper alinement of the hammock's surface with that of the mattress pad 23 (Fig. 9) to be placed over the unfolded bracket assembly 16.

The front end 21 of the hammock is long enough to be draped over the back 22 of the front or driver's seat of the car and fastened at each side thereof by means of apertured straps 55 and cooperating buckles 56, which are sewed to the opposite sides of the hammock at appropriate locations. Finally, a pole pocket 57 is provided in line with the buckle position and filled with a wood pole or steel rod 58 for the purpose of fitting against the back wall of the front seat and insuring proper alinement of the hammock over its width between the points of fastening by the straps and buckles. The assembled position of the hammock is illustrated in Fig. 1.

Fig. 9 illustrates the mattress pad 23 which may be of standard design and tailoring, and which forms an extension of the hammock for sleeping purposes. It comprises two sections, 60 and 61, of the same width as the fiber boards 26 and 27, attached to each other with a piece of their cover material 62 about one inch wide to permit easier folding of the sections over the edge of the raised or folded fiber boards 26 and 27 at the top of arc line 29 (Figs. 1 and 6). Attached to this cloth strip are pieces of cloth or flaps 63 provided with eyelets 64 on which this pad is suspended when not in use. The front end 65 of the pad is reduced in width to pass through the opening 7 in the rear seat back diaphragm or retaining structure 4 and overlap the rear end of the hammock 18.

To install the equipment for conversion of the rear section of a given car body into a sleeping compartment, the trunk compartment door 66 is opened and the fiber board cover or wall usually provided at its rear is removed, as previously noted. If the spare tire 10 is normally mounted in an upright position, it is laid down flat on the floor of the trunk space, as shown in solid lines, and any permanent fastenings with which the rear seat back cushion 5 may be attached to diaphragm 4 (such as screws 67 shown in dotted lines in Fig. 2) are removed. In their place, a sliding bolt 68 is installed on an upright reinforcing bar 69 of the rear seat back 5, as shown in Fig. 2, and left in unlocked position.

The rear back cushion 5 is then pushed forward into the car interior and away from channel 3 in the underframe. The bracket assembly 15, 16, 17 is then installed by slipping its channel 15 over channel 3 and fastening it thereto, if desired, as noted above. Thereafter the boards 26 and 27 are folded out over the spare tire 10 as shown in Fig. 1 and the forward portion (parts 31 and 44) of the bracket assembly swung back along arc 47 (Fig. 6). Thereafter suspension hooks 70 (Figs. 1 and 6) are installed on the diaphragm 4 directly below its shelf section 6, and first the hammock 18 and then its extension mattress or pad 23 are placed on boards 26 and 27 in such a way that their lines X—X (Fig. 8) and Y—Y (Fig. 9) are positioned over the hinged joint (see Fig. 5) between them. These boards, with their covers, are then pushed up (with the forearms of the installation mechanic placed beneath the rear board 27) along arc 29, Fig. 6, until the entire assembly lays flat against the rear of the diaphragm plate 4, as shown in Fig. 1, where it is hooked into position by slipping the eyelets 64 in the mattress flaps 63 over the suspension hooks 70. Thereafter the spare tire 10 is replaced in its original position and the rear door 66 closed. Thus all component items of the conversion equipment are now in their non-use or out-of-the-way position in the car.

When the car owner desires to make use of the berth assembly, he places the spare tire 10 on the floor of the trunk compartment 9, well to the rear end of the car, and unhooks the mattress flaps 63 from the suspension hooks 70. He then reaches under the mattress pad 23 to get hold of the lower edge of board 27, which is then pulled towards the rear end of the car until it is level with board 26. The spare tire 10 is then pushed back under both boards as illustrated in Fig. 1.

The next step is to unfasten the rear back cushion 5 by lowering bolt 68 and pushing the cushion into the rear section of the car body, from where it may be lifted into a position under the car roof and stored out of the way by resting one end of it on shelf 6 and supporting the other end by means of straps 71 and 72 (see also Figs. 10 to 13, inclusive). Each of these straps has a hooked end 73 which may be hooked into the drip moulding 74 on the sides of the car over the rear doors 75 (see Fig. 3). The inner end of strap 72 is provided with a buckle 76 for receiving the metal-bound inner end 77 of strap 71, thus permitting desirable adjustment of the straps, to permit retaining the cushion 5 in a suitable position. Of course, the cushion 5 may be simply placed on the front seat or otherwise suspended, but if placed as shown, then the car may be instantly driven away without requiring any further positioning of the cushion 5.

With the back cushion 5 thus out of the way, the rear seat cushion 8 is tipped up at its rear end and parts 17 of the bracket assembly lowered onto the car bottom or underframe, with channel 15 remaining in its installed position over channel 3, and brackets 35 folded to their right angle position under the bracket plate 31 and wing plates 33 folded out on both ends from under the bracket plate 31. Foldable portions 16 are also laid out flat, as shown in Figs. 1 and 6. With this assembly now in position, the rear edge 37 of the seat cushion 8 is lowered into engagement with shelf 39 or shelf 43 on each bracket 35 and filler plate 44 folded forward to bridge the gap between the cushion's rear edge and the forward edge of the bracket plate 31, if shelf 39 is used.

With the seat cushion's surface now in continuous straight alignment with the bracket assembly's parts, the hammock 18 is removed from the trunk compartment 9 and its pockets 51 slipped over the wing plates 33, after flap 52 has been folded back under the seat cushion's rear edge and looped straps 20 have been slung over the rear corners of the seat cushion, as illustrated in Figs. 1 and 4.

The front seat is then moved backward to a certain extent by means of the usual adjusting mechanism (not shown). The front end 21 of the hammock 18 is then draped over the back 22 of the front or driver's seat so that straps 55 and buckles 56 are in alignment and can be engaged and tightened as illustrated in Fig. 1. Thereafter the entire front seat is moved forward on its adjusting mechanism until the hammock is tightened as desired.

Finally, the mattress pad 23 is turned around, so that its narrow end 65 extends through the opening 7 in the diaphragm plate 4 and is pushed into contact with the rear end of the hammock 18, from where it extends to the rear end of the board 27, close to the door of the trunk compartment 9, which may now be closed.

Baggage, etc., may be stored under the hammock 18 behind the front seat of the car, so that two of the car's occupants may now avail themselves of the sleeping facilities, entering through the rear side doors much in the same manner as one enters the upper berth of a Pullman sleeper. After use, the berth equipment may again be folded up by reversing the sequence of operation just described for the routine of the berth's make-up.

It will be seen that I have thus provided a berth assembly which may be readily and without much work initially installed in a standard passenger automobile and which may then be quickly and easily placed in sleeping condition or folded up out of the way, whenever desired, by the occupant of the car. The assembly is suitably anchored in place and may be satisfactorily used by one or two people, whether the car is parked or being driven by another person.

I do not wish to be restricted to the particular structural details or arrangement of parts herein set forth, as various modifications thereof may be effected without departing from the spirit and scope of my invention, as claimed. In place of a separate mattress pad, for instance, sectional cushions may be used and individually attached to the boards or plates of the bracket assembly, wherever available headroom and clearances permit such appointments of deeper and, therefore, more luxurious upholstery; or the mattress pad may be combined with the hammock by being tailored as an extension to the latter, wherever the width of the opening 7 in the diaphragm plate 4 is sufficient for passage of such hammock therethrough. Also, separate supports may be attached to the underside of the boards in the trunk compartment, where a spare tire is not available to keep them at a proper elevation. I desire, therefore, that only such limitations shall be imposed on my invention as are indicated in the appended claims.

I claim as my invention:

1. In a vehicle having an underframe construction and a front seat and a rear seat supported thereby, a trunk compartment behind said rear seat, an apertured diaphragm disposed between said rear seat and said trunk compartment, a berth assembly having a foldable platform structure for supporting part of a human body and a hammock structure for supporting another part of the body when put under tension, said hammock structure having its respective ends detachably supported by the front seat and said platform structure and said platform structure being detachably secured to said underframe construction to form an extension of said hammock structure through said apertured diaphragm from said rear seat into said trunk compartment after removal of the back cushion of said rear seat.

2. In a vehicle having an underframe construction and a front seat and a rear seat supported thereby, a trunk compartment behind said rear seat, an apertured diaphragm disposed between said rear seat and said trunk compartment, a berth assembly having a hammock structure for supporting part of a human body when put under tension, said hammock structure having its respective ends detachably supported by the upright back of the front seat and the rear of the seat portion of the rear seat, and a foldable platform structure for supporting another part of the body and detachably secured to said underframe construction to form an extension of said hammock structure through said apertured diaphragm from the rear of the seat part of said rear seat into said trunk compartment after removal of the back cushion of said rear seat.

3. In a vehicle having an underframe construction and a front seat and a rear seat supported thereby, a trunk compartment behind said rear seat, an apertured diaphragm disposed between said rear seat and said trunk compartment, a berth assembly having a foldable platform structure for supporting part of a human body and a hammock structure for supporting another part of the body when put under tension, said hammock structure having its respective ends detachably supported by the front seat and said platform structure and said platform structure being detachably secured to a high point of said underframe construction to form an extension of said hammock structure through said apertured diaphragm from said rear seat into said trunk compartment after removal of the back cushion of said rear seat.

4. In a vehicle having an underframe construction and a front seat and a rear seat supported thereby, the rear seat having an apertured retaining structure for the back thereof, a berth assembly having a foldable platform structure for supporting part of a human body and a hammock structure for supporting another part of the body when put under tension, said hammock structure having its respective ends detachably supported by the upright back of the front seat and said platform structure and said platform structure being detachably secured to a high point of said underframe construction to form an extension of said hammock structure from said rear seat toward the rear of the vehicle, said platform structure extending through said apertured retaining structure.

5. In a vehicle having a bottom framing construction with an upwardly tapering reinforcing section disposed above the rear wheel axle location, a berth assembly having an intermediate anchor part disposed at the topmost portion of said reinforcing section, and a platform section pivotally mounted on each side of said anchor part to extend in opposite directions therefrom, one of said sections having a foldable support attached to its underside to engage the underlying portion of the bottom framing and to dispose said platform section substantially on the level of the high point of the bottom framing construction.

6. In a vehicle having a bottom framing construction, a rear seat, and a rear trunk compartment, a berth assembly having an anchor supporting section disposed near the base of the back of said rear seat on said bottom framing construction and secured thereto, a platform section pivotally mounted on said anchor section, means to dispose said platform section substantially horizontal and within said trunk compartment, and a shelf section pivotally mounted on the opposite side of said anchor section from said platform section to extend in a plane substantially in alignment with said platform section.

7. In a vehicle having a bottom framing construction with an upwardly tapering reinforcing section disposed above the rear wheel axle location, a berth assembly having an intermediate anchor part disposed at the topmost portion of said reinforcing section, a platform section pivotally mounted on each side of said anchor part to extend in opposite directions therefrom, one of said sections having a foldable support attached to its underside to engage the underlying portion of the bottom framing and to dispose said platform section substantially on the level of the high point of the bottom framing construction.

8. In a vehicle having a passenger compartment and a baggage compartment and a partition between the compartments with an opening in the partition, a platform assembly comprising an intermediate anchor member positioned adjacent the opening in said partition, two sets of leaves, each set including a plurality of leaf members foldably hinged together, one of the sets being hinged to one side of the positioning member and the other set to the other side of the positioning member, both of the sets of leaves being arranged so as to fold together with the surfaces of the leaves in substantially parallel alignment with each other and with said partition, and to unfold into a substantially straight platform extending each way from said anchor member into said passenger compartment and said baggage compartment.

9. In a vehicle having a passenger compartment with a rear seat and a baggage compartment with a partition between the compartments immediately back of the rear seat and an opening in the partition, a platform assembly comprising an intermediate anchor member positioned adjacent the opening in said partition, two sets of leaves, each set including a plurality of leaf members foldably hinged together, one of the sets being hinged to one side of the positioning member and the other set to the other side of the positioning member, both of the sets of leaves being arranged so as to fold together with the surfaces of the leaves in substantially parallel alignment with each other and with said partition, and to unfold into a substantially straight platform extending each way from said anchor member into said passenger compartment and said baggage compartment, and supports foldably hinged to said leaves which unfold into the passenger compartment, whereby the leaves in the passenger compartment are aligned with the top of said anchor member and brackets on said supports to elevate the rear edge of the cushion of said rear seat sufficiently to align the cushion with the platform assembly.

10. In a vehicle body having an elevated transverse ridge in the floor member to provide clearance for the rear axle assembly, a baggage compartment at the rear of said ridge, a passenger compartment in front of said ridge and an apertured partition between said compartments adjacent the ridge, a platform assembly comprising an intermediate anchor member positioned on said transverse ridge, two sets of leaves, each set including a plurality of leaf members foldably hinged together, one of the sets being hinged to one side of the anchor member and the other set to the other side of the anchor member, both of the sets of leaves being arranged so as to fold together with the surfaces of the leaves in substantially parallel alignment with each other and with said partition, and to unfold into a substantially straight platform extending each way from said anchor member into said passenger compartment and said baggage compartment.

WALTER DE FRIES.